United States Patent [19]

Whitehurst

[11] Patent Number: 4,470,940
[45] Date of Patent: Sep. 11, 1984

[54] METHOD FOR THE MANUFACTURE OF CAPACITIVE ELECTRONIC DISCS

[75] Inventor: Marshal L. Whitehurst, Indianapolis, Ind.

[73] Assignee: RCA Corporation, New York, N.Y.

[21] Appl. No.: 184,397

[22] Filed: Sep. 5, 1980

[51] Int. Cl.³ .............................................. B29D 17/00
[52] U.S. Cl. ................................. 264/107; 425/810; 264/338
[58] Field of Search ...................... 264/39, 107, 338; 425/810

[56] References Cited

U.S. PATENT DOCUMENTS 3,962,495 6/1976 Feldstein .......................... 425/810 X
4,262,875 4/1981 Nyman ............................. 425/810 X Primary Examiner—Donald Czaja
Assistant Examiner—V. Fischbach
Attorney, Agent, or Firm—Birgit E. Morris; Edward J. Sites

[57] ABSTRACT

Release properties of stampers used in the manufacture of capacitive electronic discs are improved by passivating the molding surface of the stamper with an oxidizing agent.

4 Claims, No Drawings

METHOD FOR THE MANUFACTURE OF CAPACITIVE ELECTRONIC DISCS

This invention relates to an improved method for the manufacture of capacitive electronic discs and more particularly is concerned with an improved stamper for the molding of the discs.

BACKGROUND OF THE INVENTION

Capacitive electronic discs are a recently developed form of molded information storage media on which extremely large volumes of information can be stored as compared to similar size magnetic tapes, magnetic discs, or conventional molded audio type records of the type played with a piezoelectric pickup. The information is molded into capacitive electronic discs in the form of a signal track, which can be a groove which has geometrical variations in depth the which corresponds to the information which is recorded. Capacitive electronic discs are played on special players which have electrically conductive styli. When the disc is played the stylus follows the signal track in the disc and a capacitance is established between the stylus and disc. The capacitance will vary in response to the geometrical variations in the depth of the signal track. The variations in capacitance which occur as the disc is played is converted by electronic means into an electronic signal which is then used to regenerate the recorded information.

The information which can be recorded on a capacitive electronic disc can include computer programs, texts of various types of books, catalogs, and manuals, music and television programs. Video discs are a special type of capacitive electronic discs which when played on a suitable player can be used to reproduce recorded programs on a television set of the type commonly used in the home. Such a video disc and player is disclosed is U.S. Pat. No. 3,842,194, issued Oct. 15, 1974, to Jon K. Clemens entitled, "INFORMATION RECORDS AND RECORDING/PLAYBACK SYSTEMS THEREFOR".

Capacitive electronic discs are molded from electrically conductive materials in order to establish the aforesaid capacitance between the playback stylus and the disc. Electrical conductivity of the molding compound is typically obtained by incorporating substantial amounts of conductive carbon black in the molding compound used to make the disc.

Capacitive electronic discs are different in kind from conventional audio records with regard to the size of the individual molded signal elements, the density of the recorded information, and the manner of playback. The signal elements of a conventional audio record have a wavelength of about 6 microns (60,000 angstroms) while the signal elements of a capacitive electronic disc have a wavelength of only 500 to 1,000 angstroms. The recorded grooves of a conventional audio record are typically 50 to 60 microns wide with about 200 grooves per centimeter. The recorded grooves on a capacitive electronic disc are only about 2.7 microns wide and there are about 4,000 grooves per centimeter. Conventional records are played with a piezoelectric pickup and are designed to operate at a frequency of about 10,000 hertz while being played at $33\frac{1}{3}$ revolutions per minute (rpm). Capacitive electronic discs, on the other hand, are played with a capacitive pickup stylus operating at about 950 megahertz and are played at about 450 rpm's or even higher.

Capacitive electronic discs may be compression molded like conventional audio records except that much greater care must be taken in the molding operation to insure that satisfactory discs are produced. The problems which are encountered in the manufacture of conventional records are encountered in the manufacture of capacitive electronic discs but, because of the smaller size and higher density of the signal elements on a capacitive electronic disc, the problems are greatly exaggerated. Many minor size imperfections introduced in the molding process which cause no substantial problems in playback of conventional audio records can cause a major loss of signal, called dropouts, on capacitive electronic discs.

The changes required in the molding procedure for capacitive electronic discs starts with the recording of the substrate used in the matrixing process. Conventional audio records are made by first recording the desired information into a wax or lacquer substrate which is then copied in a matrixing process. The recording for capacitive electronic discs cannot be made in wax or lacquer as these materials cannot be cut with the accuracy required to reproduce the small signal elements and, furthermore, the lacquer or wax will not retain the recorded signal without excessive distortion in the matrixing process. It has been found that the recording of substrates for capacitive electronic discs has to be made in specially prepared electrodeposited hard, fine grained copper substrates.

The recorded copper substrates are electroplated with nickel to form a series of masters. The nickel masters are then electroplated with nickel to form molds. The molds are then electroplated with nickel to form stampers. The stampers are used to mold the thermoplastic compositions to form the discs. Each step in the matrixing process, that is, the formation of the masters, molds, and stampers, must be conducted under extremely carefully controlled, essentially clean room conditions, to ensure that the stampers will accurately reflect the recording made in the copper substrate.

The stampers are installed in record molding presses which are specially adapted for the molding of capacitive electronic discs. In the molding process the molding compound is heated until it becomes soft and moldable. The softened compound is then molded between the stampers which impress the recorded disc with the signal elements defined on the surface of the stamper. The stampers are then chilled to solidify the molding composition and the molded disc is removed from the stampers. It is extremely important that the molded disc separates easily without any distortion from the stamper in that any sticking or the like can cause substantial distortion of the molded signals in the disc and cause undesirable noise on the playback of the disc. Poor release of the molded disc has, however, become a serious manufacturing problem. The sticking problems encountered with capacitive electronic discs are much greater than that normally encountered in the molding of conventional audio records. This is believed to be because of the much smaller size of the recorded signals and the closer packing of the signals on a capacitive electronic disc as compared to the conventional record.

Furthermore, the techniques used to overcome sticking in the manufacture of conventional records cannot be employed in the manufacture of capacitive electronic discs. The record stampers used for molding of conventional records are polished after matrixing with a mild abrasive to provide a bright smooth surface. In addition, as required, the stampers are polished in the press to decrease sticking of the records to the stampers. Stampers used for capacitive electronic discs cannot be polished after matrixing or in the press as the polishing, even mild polishing, causes a substantial decrease in the quality of the signal produced on playback of the molded disc.

In the manufacture of conventional audio records relatively large amounts of mold release agents such as silicone oils are applied to the stampers to improve the release properties without affecting the quality of the recording. The signals on a conventional record are larger and are on the side of the grooves not in the base so that excess release agents can accumulate in the base of the grooves without causing problems. The use of mold release agents in any substantial amount on the stampers used for capacitive electronic discs can result in a substantial distortion of the recorded signal especially if the mold release collects in the base of the grooves wherein the signal elements are recorded.

It would be highly advantageous if a method could be provided which would improve the release properties of stampers used in the manufacture of capacitive electronic discs without adversely affecting the quality of the recorded records.

SUMMARY OF THE INVENTION

It has been found that the release properties of stampers used in the manufacture of capacitive electronic discs can be substantially improved by passivating the molding surface of the stamper with an oxidizing agent.

DETAILED DESCRIPTION OF THE INVENTION

In describing the present invention specific attention will be directed to the passivation of nickel stampers, because nickel stampers are the preferred type of stampers for molding of capacitive electronic discs. However, it should be appreciated that other types of stampers can likewise be passivated to improve their release properties. These stampers may include in, addition to nickel stampers, nickel alloy stampers, silver stampers, copper stampers, and the like, as well as bimetallic stampers comprised of layers of different metals.

The passivation is preferably conducted by immersing the stamper, prior to mounting the stamper in the molding press, in an aqueous passivation bath containing an alkaline cleaner and an oxidizing agent. The alkaline cleaners which are preferably used in the method of this invention include trisodium phosphate, tetrasodium pyrophosphate, and mixtures of these materials. The amount of the alkaline cleaner added to the bath is not critical but should be an amount which is sufficient to remove surface contamination from the stampers so as to facilitate the uniform passivation of the stampers. It has been found that if the aqueous passivation bath contains about 30 grams per liter of trisodium phosphate and 30 grams per liter of tetrasodium pyrophosphate, excellent results are obtained in a passivation process.

It is also preferable to include in the aqueous passivation bath a wetting agent to improve the effectiveness of the cleaner and the uniformity of the passivation treatment.

The oxidizing agents which have been found to be especially satisfactory include potassium dichromate, sodium dichromate, potassium permanganate, sodium permanganate, and mixtures of these oxidizing agents. The oxidizing agent should be present in the passivation bath in an amount of about 5–30 grams per liter. When passivating nickel stampers, it has been found that about 5 grams per liter of potassium dichromate gives the optimum results.

The time of immersion in and the temperature of the aqueous passivation bath, which are required to obtain satisfactory passivation of the stampers, are interdependent. As the temperature is increased, the time of the immersion can be decreased. It has been found that the optimum results are obtained when the bath is maintained at about 70° C. and the time of immersion is about 1 minute. After passivation the stampers are rinsed and dried. No further treatment is required.

The capacitive electronic disc stampers passivated as noted above have been found to exhibit excellent release properties in the molding process, especially as compared to unpassivated stampers. Stampers made from the same molds were tested by passivating certain of the stampers and leaving the others untreated. In the press runs it was found that the passivated stampers exhibited essentially no release problems while the unpassivated stampers exhibited considerable sticking problems. The passivated stampers were also found to be more resistant to staining in the molding process as compared to unpassivated stampers. It was further found that the discs made from the passivated stampers were superior with regard to the quality of playback as compared to discs made from unpassivated stampers.

It is highly surprising that the passivated stampers would have such excellent release properties and other improved properties, especially compared to the unpassivated stampers. In the molding of conventional audio records it is believed that bright, highly polished, metallic surfaces have the optimum release properties. It is for this reason that the record stampers used for conventional records are polished before being used in the molding and thereafter polished if sticking occurs.

The release properties of the passivated stampers are even more surprising in view of the practice in the general molding art. When metal inserts are desired to be molded into a plastic body, it is standard practice to initially subject the metal inserts to various surface treatments such as oxidation or phosphating in order to increase adhesion of the molding composition to the surface of the metal. The result obtained in the conventional molding process is completely opposite to that obtained in the present process for the manufacture of capacitive electronic discs wherein the adhesion is substantially reduced.

The reason that passivation improves the release properties of capacitive electronic disc stampers is not known. While there is no intention to limit the scope of the invention to any theory of invention set forth hereinafter, it is believed that the unusual and unexpected results of passivating the surface of the stampers may be due to a combination of both the type of material used for the molding of capacitive electronic discs and the fact that the stampers have a unique type of surface which has extremely small signal elements defined therein.

What is claimed is:

1. In an improved method for the manufacture of capacitive electronic discs in which a thermoplastic composition is molded with a metallic stamper having defined in the molding surface thereof information desired to be molded into the disc, the improvement which comprises passivating the molding surface of the stamper by immersing the stamper in an aqueous bath comprised of an alkaline cleaner and oxidizing agents selected from the group consisting of potassium dichromate, sodium dichromate, potassium permanganate, sodium permanganate, and mixtures thereof, whereby a molded disc formed on the stampers readily releases from the molding surface of the stamper.

2. The method according to claim 1 wherein the alkaline cleaner is selected from the group consisting of trisodium phosphate, tetrasodium pyrophosphate and mixtures thereof.

3. The method according to claim 2 wherein the oxidizing agent is potassium dichromate.

4. The method according to claim 1 wherein the stamper is comprised of nickel and is passivated by immersing the stamper in an aqueous bath containing about 30 grams per liter of trisodium phosphate, about 30 grams per liter of tetrasodium pyrophosphate and about 5 grams per liter of potassium dichromate and wherein said bath is maintained at a temperature of 70° C. and said stamper is immersed in said bath for approximately 1 minute.

* * * * *